United States Patent Office 3,518,208
Patented June 30, 1970

3,518,208
CATALYST FOR THE WATER GAS SHIFT REACTION
Michael R. Schneider, Moosburg, Germany, assignor to Girdler-Sudchemie Katalysator G.m.b.H., Munich, Germany, a corporation of Germany
No Drawing. Filed Aug. 8, 1966, Ser. No. 570,769
Int. Cl. B01j *11/06*
U.S. Cl. 252—468
2 Claims

ABSTRACT OF THE DISCLOSURE

Catalysts effective in the reaction of carbon monoxide and steam to form hydrogen at carbon dioxide in the temperature range from 180° to 460° C., comprising oxides of copper, zinc and iron, and procedures for using such catalysts to produce hydrogen at relatively low temperature.

---

This invention relates to novel catalysts which are operative in the water gas shift reaction wherein carbon monoxide and steam are converted to carbon dioxide and hydrogen. More particularly, this invention relates to iron oxide-copper oxide-zinc oxide catalysts and methods of producing hydrogen at relatively low temperature from steam and carbon monoxide.

The production of hydrogen by shift conversion of carbon monoxide using catalysts is an old and established process in industry.

The equilibrium governing the reaction $$CO + H_2O \rightleftharpoons CO_2 + H_2$$

is dependent upon temperature and lower temperature favors the formation of hydrogen.

The commonly used catalysts for this reaction contain as the main component iron oxide and contain usually small amounts of chromium oxide to stabilize the activity. With these catalysts the operating temperature of the process usually lies within 340–460° C. Below 340° C. these catalysts in general are not active enough to bring about an economic conversion.

In recent times copper- and zinc-containing catalysts have been used in industry for the shift conversion of carbon monoxide. They are very much more active than the older type "iron oxide" catalysts. With them, reaction temperatures from 180° C. upwards can be employed for an economic shift conversion of carbon monoxide. The advantages gained by use of low-temperature shift catalysts are obvious.

Due to expensive raw materials and high bulk densities obtained, the production costs for tableted or otherwise formed pure copper-zinc catalysts are high. It is a known practice to lower the costs of raw materials by adding cheap inert materials to the components responsible for the characteristics of the substance involved.

In catalysts, these diluents very often have more extensive functions than the one mentioned. Their choice is also governed by thermal stability properties and their specific surface area. These substances are then generally known as catalyst carriers. The active part of the catalyst is, in accordance with standard operating procedures, deposited on the carrier. The use of a carrier usually brings about an increase in surface area thus often increasing the activity of the catalyst. Furthermore, the carrier generally having greater thermal stability than the active components increases the thermal stability and because of this prolongs the life of a catalyst.

It is known that the improvement of a catalyst obtained by the use of a carrier often cannot be explained alone by the facts just mentioned. The improved qualities of the catalysts are then attributed to reciprocal effects of an unknown nature between the carrier and the active components. The term "carrier" does therefore in many cases not explain the significance which these substances have.

In knowledge of the above, a series of shift catalysts were prepared by general procedures using, besides copper and zinc compounds, substances which in catalysis can be used as carriers.

I have discovered that catalysts composed of iron oxide-copper oxide-zinc oxide, with or without chromium oxide, are highly active at the temperature range where normally the expensive pure copper oxide-zinc oxide type catalysts are used and are highly active at the temperature range where normally iron oxide-chromium oxide type catalysts are used for catalyzing the reaction of carbon monoxide and steam to produce hydrogen and carbon dioxide.

Surprisingly enough copper oxide-zinc oxide catalysts, having an addition of silicon dioxide in the form of quartz powder or kieselguhr or having additions of aluminum oxide, magnesium oxide, alkaline earth metal carbonates, titanium dioxide, or bleaching earth either had an activity reduced in proportion to the amount of carrier added or had practically no activity at all.

In contrast thereto, the iron oxide-copper oxide-zinc oxide catalysts are as active as or more active than the conventional pure copper oxide-zinc oxide at temperatures where the latter are normally used for the water gas shift reaction. The iron oxide-copper oxide-zinc oxide catalysts furthermore are far more active than conventional iron oxide catalysts at a temperature range where the latter are normally put to service for the water gas shift reaction.

It is a further advantage of these new catalysts that they can be produced at a lower price than the pure copper oxide-zinc oxide type catalysts.

Principally, all catalysts lose their initial activity if they are heated at too high a temperature. In the temperature range of 340–460° C., pure copper oxide-zinc oxide type catalysts quickly lose their initial activity. The new catalysts of this invention, being a combination of the long-known iron oxide type catalysts and the newer type copper oxide-zinc oxide catalysts, in this temperature range will show a stable basic activity. This is a further advantage obtained by the use of these catalysts.

It is an object of this invention to provide new catalysts which are highly active in the water gas shift reaction at low and high temperatures. Another object is to provide highly efficient water gas shift procedures suitable for the commercial manufacture of hydrogen. Another object is the production of iron oxide-copper oxide-zinc oxide catalysts. A further object of this invention is to provide a catalyst composed of the oxides of copper, zinc, iron and chromium which has the equal or bigger activity of the known copper-zinc oxide catalysts in the low temperature range, thus involving lower costs of production and which can be employed in the temperature range of 340–460° C., hereby showing better activity than the long known iron oxide type catalysts.

These new catalysts with properties mentioned can be produced by methods in which copper and zinc compounds are precipitated and fixed on the surface of insoluble iron and chromium compounds, whereby the signal particles which make up the catalyst are not homogeneous in composition. The new catalysts can also be produced by methods which lead to a homogeneous distribution of the components. One such method is the simultaneous precipitation of the four components from a common solution.

The catalysts which comprise this invention contain 1–35% CuO, 1–60% ZnO, 5–98% $Fe_2O_3$, 0–5% $Cr_2O_3$. The preferred composition is 10–20% CuO, 20–45% ZnO, 35–70% $Fe_2O_3$ and 0–5% $Cr_2O_3$.

In the following examples methods for preparing these catalysts are given. The purpose of the examples is to give a better understanding of the invention. It will be understood by those skilled in the art that various modifications in operating conditions may be made without departing from the invention as disclosed herein.

One of the methods of preparation is characterized by precipitating compounds of copper and zinc out of solution onto a slurry of finely divided iron oxide or iron oxide-chromium oxide catalyst. This can be done by slurrying the iron oxide catalyst in the copper-zinc salt solution and precipitating these metals on the catalyst by heating the slurry. Alternatively, the precipitation can be accomplished using precipitating agents such as alkalies or soluble carbonates. A further variation of the catalyst preparation is a process by which all the components are simultaneously precipitated. In all examples parts of materials are by weight.

EXAMPLE 1

1.65 part of of zinc oxide, 0.81 part of copper oxide and 2.41 parts of ammonium bicarbonate are dissolved in 6.27 parts of 25% ammonia solution to obtain a concentrated solution of the metalamine carbonate. 2.5 parts of a finely divided iron oxide catalyst are slurried into the solution and kept in suspension by constant stirring. Steam is blown into a slurry. The metalammines are decomposed and the zinc and copper are deposited on the iron oxide catalyst in the form of carbonates or basic carbonates. The slurry is filtered, the solid material is dried, then calcined at 400° C. to convert the carbonate salts into the oxides. The resulting material is put through a granulator, 1% graphite is added and then the material is tableted to form 6 mm. tablets. Should the iron oxide catalyst have been made by a process leading to a sulfur-containing material then care must be taken to remove the sulfur by washing before employing the catalyst as a component for the above preparation. It is known that sulfur is a severe poison for copper- and zinc-containing low temperature shift catalysts.

EXAMPLE 2

3.1 parts of a finely divided iron oxide shift conversion catalyst are suspended in 50 parts of water. 4.0 parts of $CuSO_4 \cdot 5H_2O$ and 8.6 parts of $ZnSO_4 \cdot 7H_2O$ are together dissolved in 35 parts of water. The solution is added to the slurry 5.0 parts of anhydrous sodium carbonate were dissolved in 35 parts of water and with constant stirring the slurry is quickly added to the sodium carbonate solution. The precipitate is filtered and the catalyst freed from soluble salts by decanting and washing with water. The drying, calcining, granulation and tableting were conducted as in Example 1.

EXAMPLE 3

4.9 parts of $FeSO_4 \cdot 7H_2O$, 2.0 parts of $CuSO \cdot 5H_2O$, 4.3 parts of $ZnSO_4 \cdot 7H_2O$ and 0.3 parts of $Na_2Cr_2O_7 \cdot 2H_2O$ were dissolved in 30 part of water. 4.7 parts of anhydrous sodium carbonate were dissolved in 20 parts of water and with constant stirring the first solution was added within 30 minutes to the sodium carbonate solution. After addition, the resulting slurry was stirred for another 30 minutes, then the solids filtered; the solids were for several times slurried in water and decanted to free them from soluble salts. The catalyst solids were filtered again, then as described in Example 1 dried, calcined, granulated and tableted.

EXAMPLE 4

Another form of preparing these catalysts is characterized by a thorough mixing of the oxides, hydroxides, salts of copper, zinc, iron and chromium in a mixer that can be heated.

100 parts of $Zn(CH_3COO)_2 \cdot 2H_2O$ were added to 60 parts of water in the mixer and heated to dissolve the zinc acetate. 50 parts of a low bulk density $Fe_2O_3$ and 20 parts of basic copper carbonate were added. The thick slurry was heated, thereby evaporating the water and decomposing the acetate. The solid mass obtained was taken out and calcined for two hours at 400° C. The material was granulated, 1% of graphite added and then tableted to form 6 mm. tablets as described in Example 1.

This catalyst containing oxides of copper, zinc and iron only had good activities.

TEST PROCEDURE

The prepared catalysts were tested for activity. The following table gives a comparison of the low temperature shift conversion obtained. The same gas mixture was passed over each of the catalysts. The dry gas composition was 25% CO and 75% $H_2$ by volume. The steam/gas ratio was 1 by volume. The reaction temperature was 260° C. Pressure was 1 atmosphere. Dry gas space velocity was 5000 volumes of gas per volume of catalyst per hour.

The exit gas was analyzed and the CO conversion expressed as $$\frac{\text{percent } CO_2}{\text{Percent } CO + \text{percent } CO_2} \times 100$$

was calculated to compare activities, as shown in Table I.

TABLE I

| | Conventional Cu-Zn oxide catalyst, percent | Catalyst of— | | | | Conventional Fe-Cr oxide catalyst, percent |
|---|---|---|---|---|---|---|
| | | Ex. 1, percent | Ex. 2, percent | Ex. 3, percent | Ex. 4, percent | |
| Composition: | | | | | | |
| CuO | 33 | 16.2 | 18.6 | 13.0 | 14.1 | |
| ZnO | 66 | 32.8 | 35.2 | 24.7 | 36.5 | |
| $Cr_2O_3$ | | 2.4 | 2.3 | 3.0 | | 5 |
| $Fe_2O_3$ | | 47.5 | 42.9 | 58.5 | 48.5 | 94 |
| CO conversion | 57.6 | 71.8 | 60.3 | 52.0 | 62.8 | 1–2 |

In the next table (II) a comparison between the customary iron-chromium oxide type catalyst and the new catalysts of this invention shows the distinct superiority of the latter at elevated temperatures. The runs were carried out under the following conditions: Dry gas space velocity=750. Reaction temperature=360° C. The other conditions were as stated above.

TABLE II

CO Conversion: Percent
Customary Fe-Cr catalyst _____ 74.6
Catalyst of Example 1 _____ 93
Catalyst of Example 3 _____ 93

93% conversion corresponds to 100% of theory. The chemical equilibrium at these conditions does not allow for a conversion beyond 93%.

I claim:
1. Catalysts for low and high temperature water gas shift reaction consisting essentially of 1–35% CuO, 1–60% ZnO, 5–98% $Fe_2O_3$ and 0–5% $Cr_2O_3$ by weight.
2. Catalysts according to claim 1 having the composition 10–20% CuO, 20–45% ZnO, 35–70% $Fe_2O_3$ and 0–5% $Cr_2O_3$ by weight.

References Cited

UNITED STATES PATENTS

| | | | |
|---|---|---|---|
| 2,418,888 | 4/1947 | Kearby | 252—231.5 |
| 1,934,795 | 11/1933 | Frazer | 23—234 |
| 1,959,313 | 5/1934 | Vail | 23—233 |
| 1,889,672 | 11/1932 | Larson | 252—471 XR |
| 1,809,978 | 6/1931 | Larson | 252—468 XR |
| 2,106,597 | 1/1938 | Ferguson | 23—212 |
| 2,193,464 | 3/1940 | Natta. | |
| 1,680,807 | 8/1928 | Schultze | 252—468 XR |

FOREIGN PATENTS 1,020,613  12/1957  Germany.

DANIEL E. WYMAN, Primary Examiner
P. M. FRENCH, Assistant Examiner

U.S. Cl. X.R.
252—470, 472, 473